Jan. 10, 1961   B. H. RULE   2,967,661
POINT IN SPACE COMPUTER
Filed March 12, 1946   9 Sheets-Sheet 1

INVENTOR
*BRUCE H. RULE*
BY
ATTORNEY

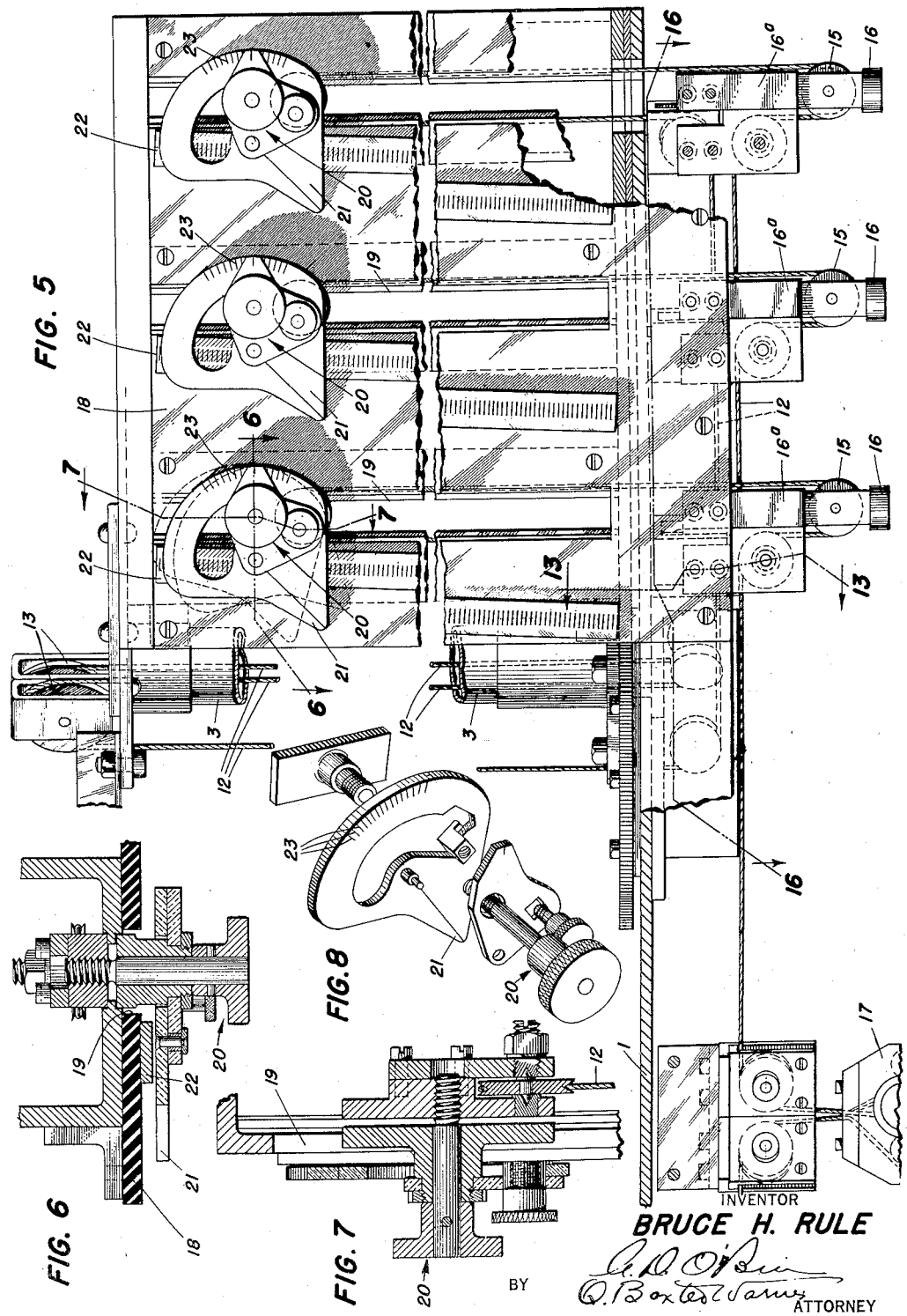

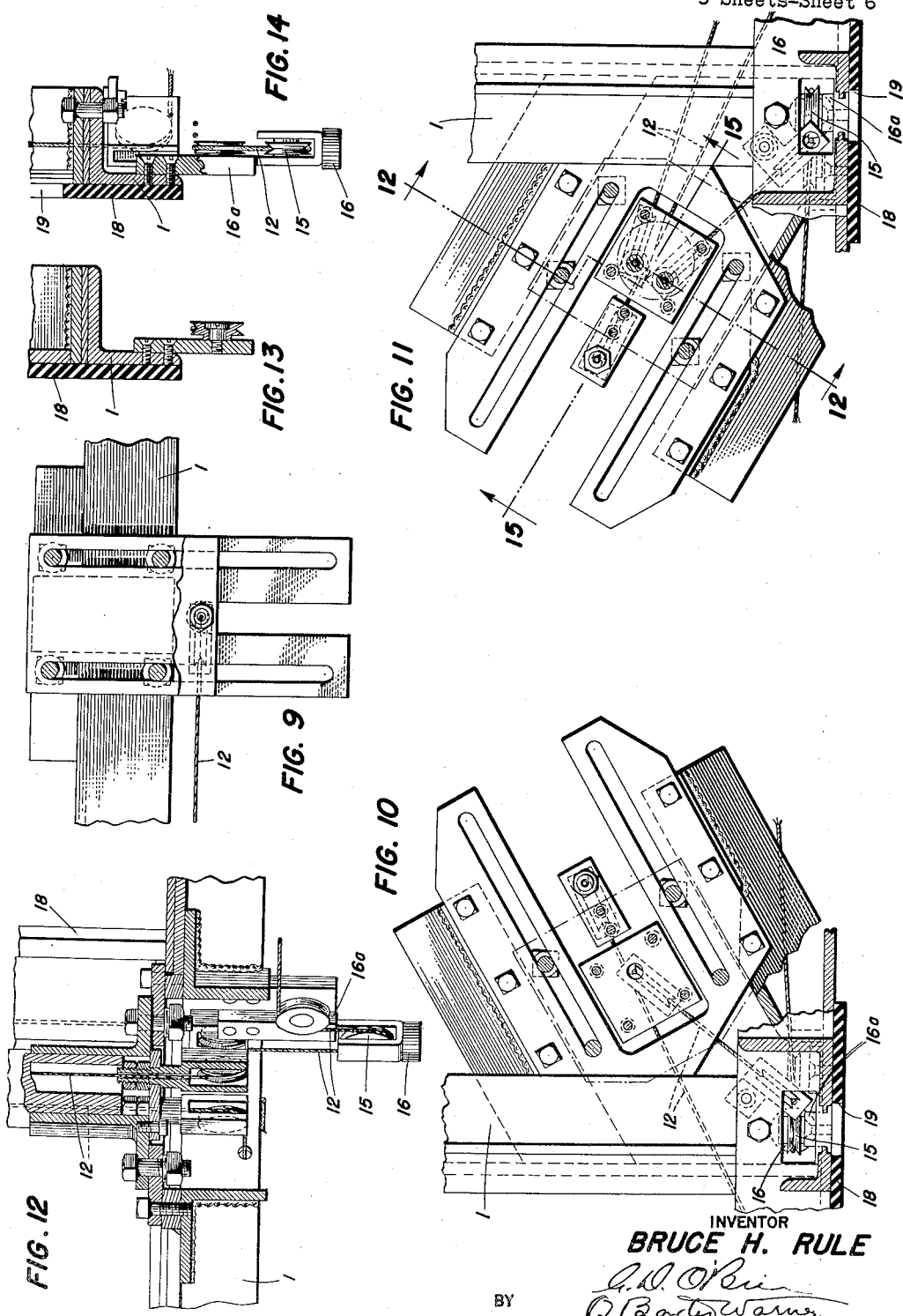

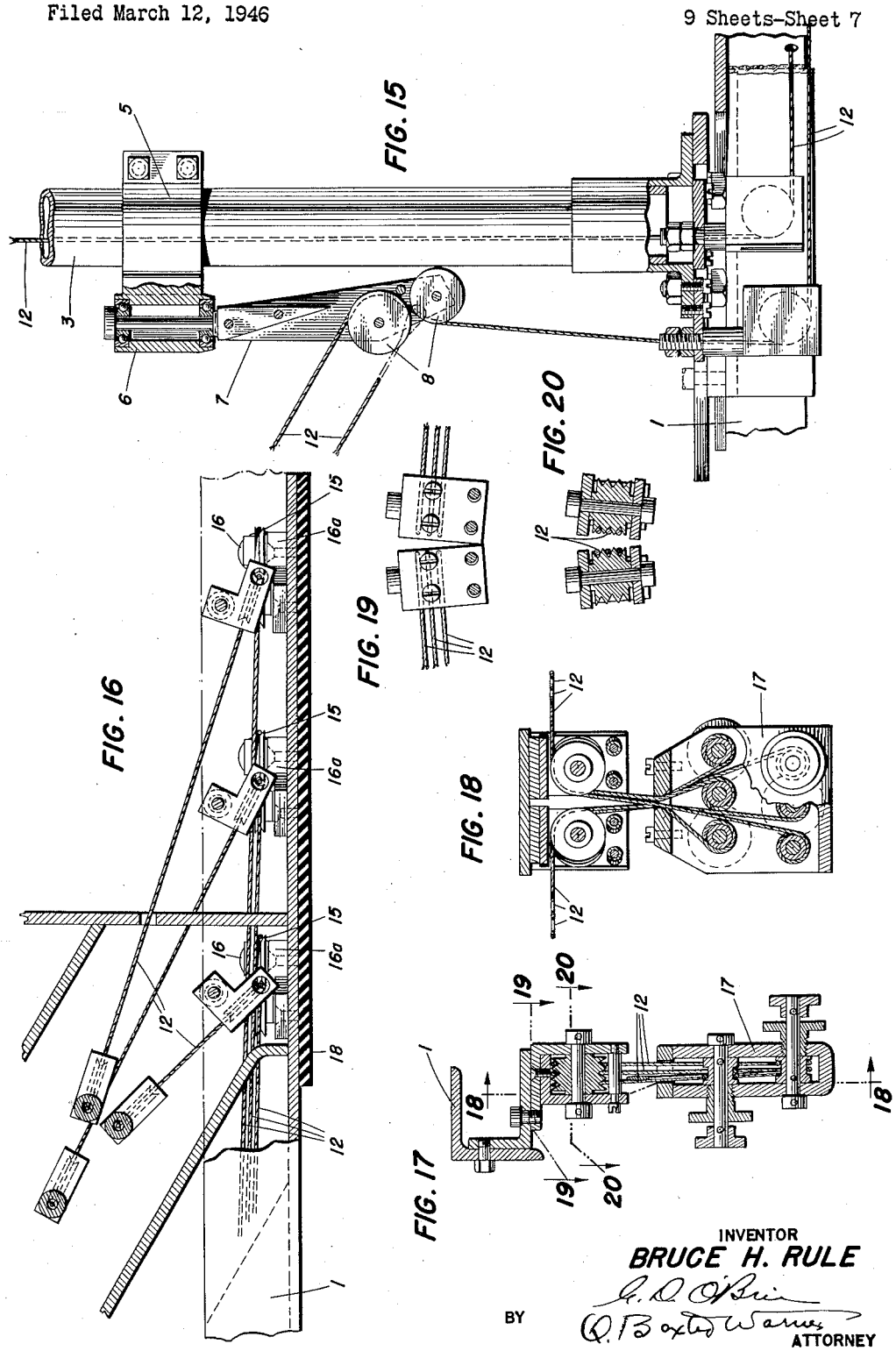

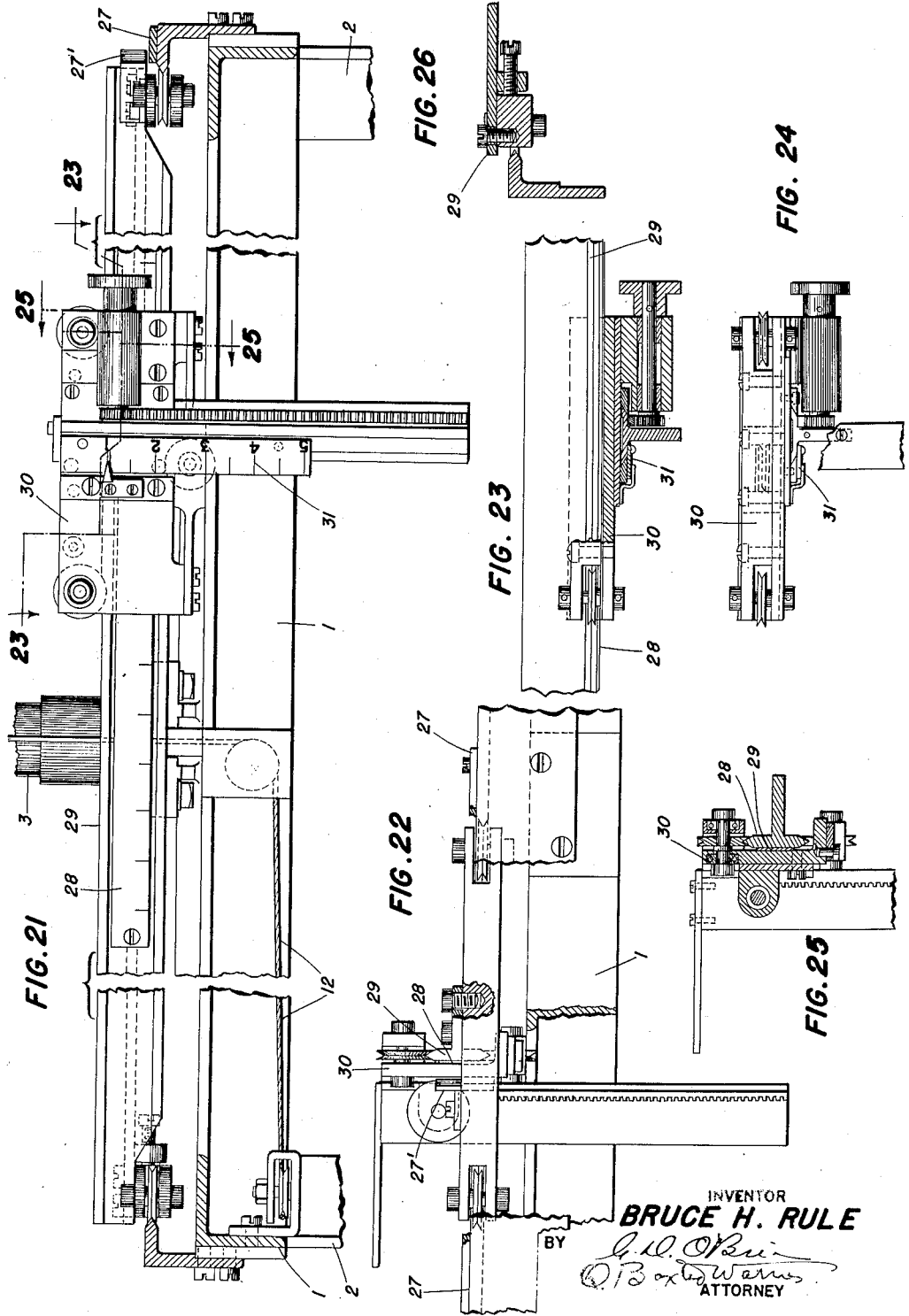

Jan. 10, 1961   B. H. RULE   2,967,661
POINT IN SPACE COMPUTER
Filed March 12, 1946   9 Sheets-Sheet 9

INVENTOR
BRUCE H. RULE
BY
ATTORNEY

United States Patent Office 2,967,661
Patented Jan. 10, 1961

2,967,661

POINT IN SPACE COMPUTER

Bruce H. Rule, Pasadena, Calif., assignor to the United States of America as represented by the Secretary of the Navy Filed Mar. 12, 1946, Ser. No. 653,911

3 Claims. (Cl. 235—61)

This invention relates to computing machines and more particularly to an improved three dimensional mechanical computer so designed that the time differential involved in the transmission of a sound from an unknown point of origin to a series of sound sensitive devices is utilized to compute the location of the sound source.

Among the objects of my invention are:

To provide a computing machine which is particularly designed to facilitate computation of the underwater trajectories of various devices such as bombs, depth charges, and torpedoes, but may be employed in principle as a range computing device for determining the location of a distant source of sound.

To provide a computing machine of this character whereby a relatively inexperienced and untrained person may readily and quickly solve certain types of mathematical problems which would otherwise require complicated and time consuming calculation.

To provide a computing machine which is inherently capable of determining with precision the origin of a sound within a specified region.

To provide a computing machine of this character which is, in effect, a scale representation of the range for which it is intended to be used, points within the computing machine bearing a scale relationship to the locations of sound sensitive devices associated with said range, such correspondence being provided in each machine whether the locations of the sound sensitive devices are irregularly or geometrically related.

To provide a computing machine which by reason of the simplicity with which data pertaining to each of several sound sensitive devices may be accumulated, enables the use of more points of reception of the sound than are needed to determine mathematically the point of sound origin, whereby the data concerning the extra points of detection may serve as a check upon the accuracy of the others.

To provide a computing machine which is capable of determining with precision the origin of sound within specified regions and with simple multiplying scale pointers, and which compensates for temperature changes and gradients in the sound range.

With the above and other object in view, as may appear hereinafter, reference is made to the accompanying drawings, in which:

Fig. 5 is an enlarged elevation, partially broken, of the computing machine, illustrating the adjusting mechanisms;

Fig. 6 is a horizontal section taken along the line 6—6 of Fig. 5;

Fig. 7 is a substantially vertical section taken along the line 7—7 of Fig. 5;

Fig. 8 is an exploded perspective view of one of the adjusting mechanisms;

Fig. 9 is a fragmentary horizontal sectional detail view of a portion of the table;

Fig. 10 is a plan view, partially in section, of another portion of the table;

Fig. 11 is a plan view, partially in section, of still another portion of the table;

Fig. 12 is a vertical section taken along the line 12—12 of Fig. 11;

Fig. 13 is a vertical section of a portion of the table;

Fig. 14 is a vertical section of another portion of the table;

Fig. 15 is a vertical section taken along the line 15—15 of Fig. 11;

Fig. 16 is a horizontal section taken along the line 16—16 of Fig. 5;

Fig. 17 is a vertical section of still another portion of the table;

Fig. 18 is a vertical section taken along the line 18—18 of Fig. 17;

Fig. 19 is a horizontal section taken along the line 19—19 of Fig. 17;

Fig. 20 is a horizontal section taken along the line 20—20 of Fig. 17;

Fig. 21 is a fragmentary vertical sectional view of the traveler frame;

Fig. 22 is right end elevation, partially in section, of the traveler frame;

Fig. 23 is a fragmentary horizontal section taken along the line 23—23 of Fig. 21;

Fig. 24 is a plan view of the slide for the vertical coordinate scale;

Fig. 25 is a vertical section taken along the line 25—25 of Fig. 21;

Fig. 26 is a vertical section taken along the line 26—26 of Fig. 4;

Figure 1:
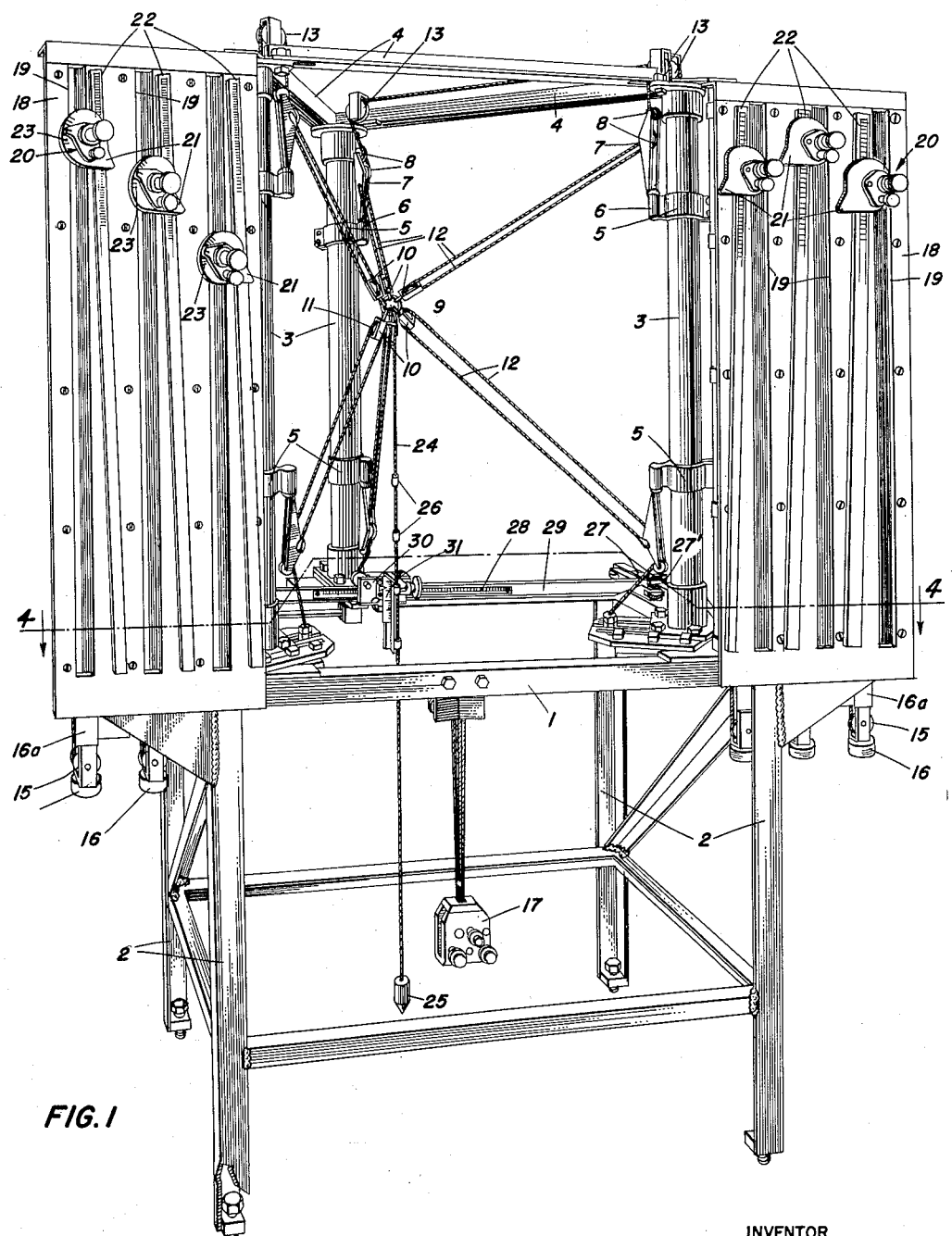
Fig. 1 is a perspective view of the front of the computing machine.
Figure 2:
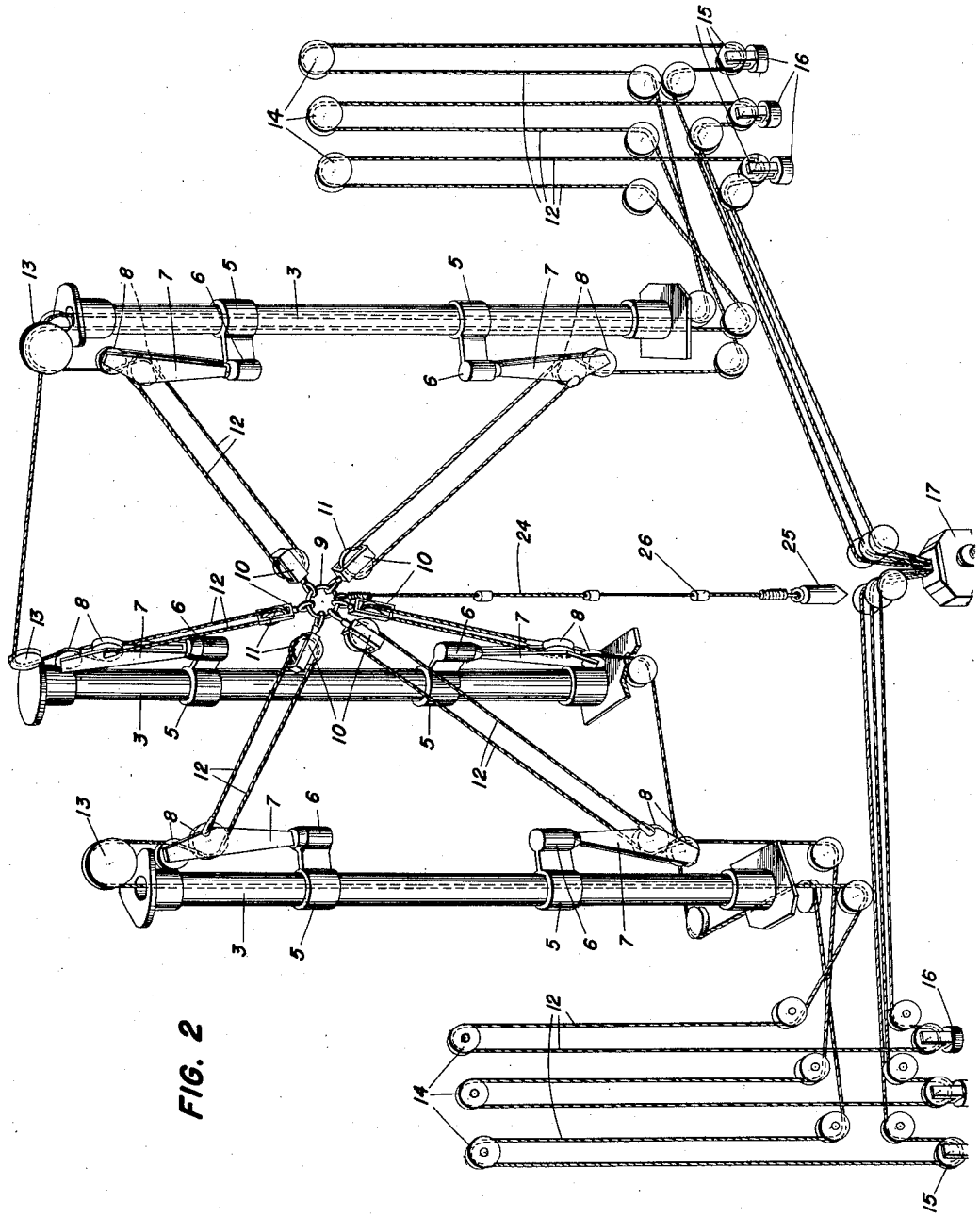
Fig. 2 is a diagrammatic perspective view of some of the essential operating elements of the computing machine.
Figure 3:
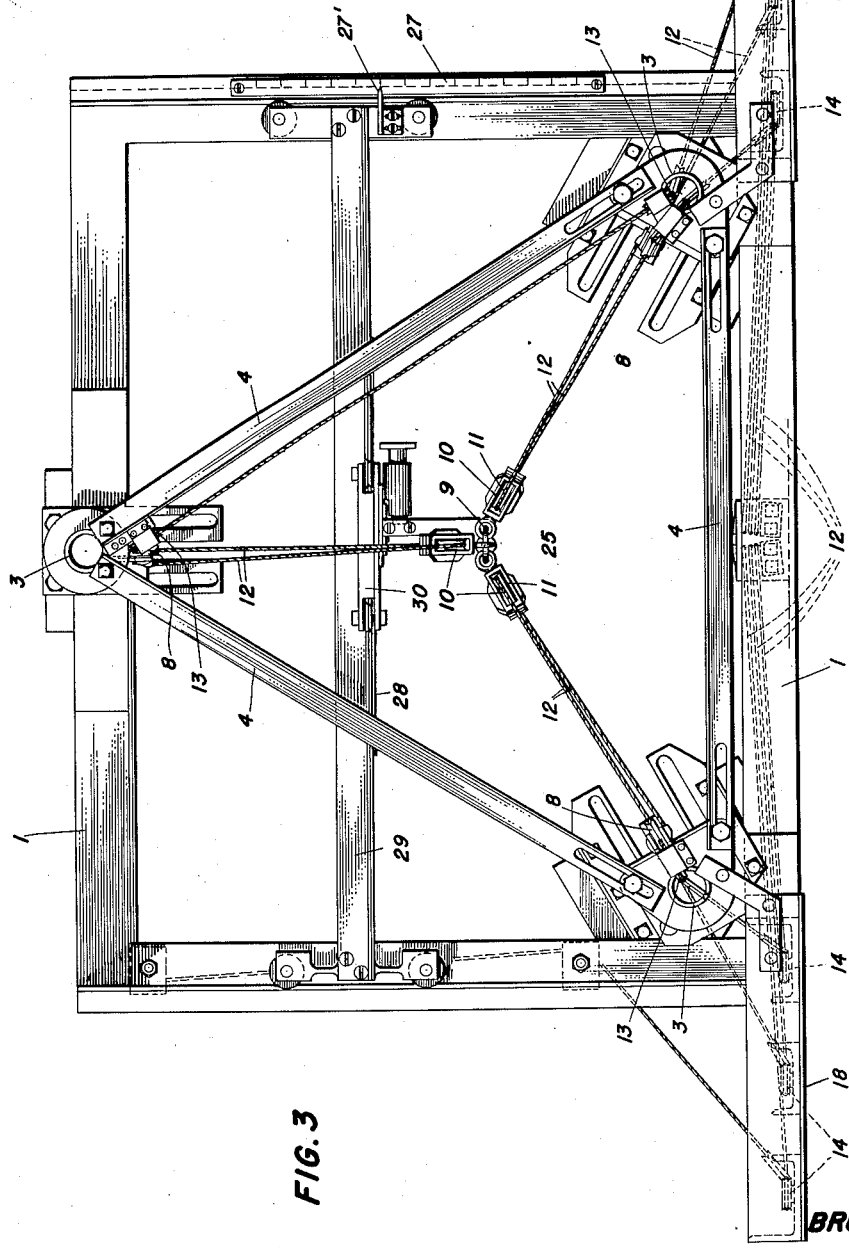
Fig. 3 is a plan view of the computing machine.
Figure 4:
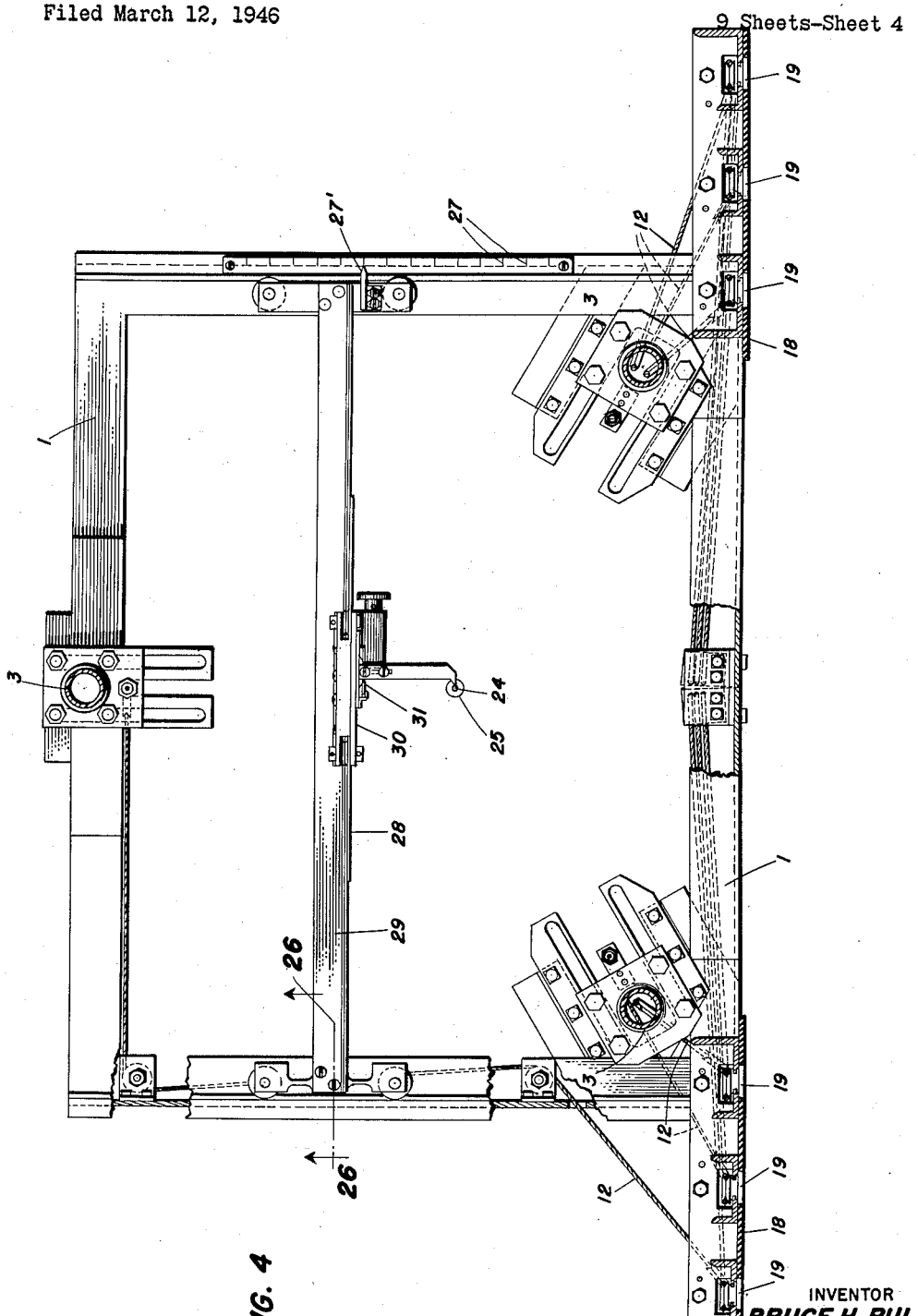
Fig. 4 is a horizontal section taken along line 4—4 of Fig. 1.

The particular computing machine herein illustrated is designed for use in conjunction with a special testing range. The range is located underwater and is defined by six hydrophones located at the corners of an equilateral triangular prism. The computing machine may be considered as, in a sense, a small scale reproduction of the range as defined by the hydrophones, and when set, by means of data obtained through use of the hydrophones, the location of the sound origin is graphically represented in the machine.

The apparatus is mounted on a table 1 that is in the form of an open rectangular frame. The table is supported at working height by a plurality of legs 2. Supported on the table are three vertical posts 3, which are connected together at their upper ends by three braces 4. Each post 3 carries two vertically adjustable brackets 5, each of which supports a swivel 6. Each swivel 6 is adapted to turn bodily about a vertical axis in its bracket 5 and includes a yoke 7, which is provided with a pulley system 8. The upper set of three swivels 6 extend upward whereas the lower set of swivels extend downward from their brackets 5.

A small metal ring 9 is adjustably suspended in the prismatic space of which the vertical boundaries are defined by the three posts 3. When the machine is set or adjusted, as will be described hereafter, the ring 9 represents the origin of the sound impulse to be located.

Six pulley yokes 10 are connected to and diverge from the ring 9, the several yokes being freely swingable independently of one another. Each yoke 10 journals a traveler pulley 1. A steel wire line 12 anchored in each swivel 6 passes therefrom around the corresponding traveler pulley 11 and back to the pulley system 8 carried by the swivel 6. Three of the six wires 12 pass over three crown pulleys 13 located at the upper ends of the posts 3. These three wires 12 pass downwardly through the front posts to the front portion of the table. The other three wires 12 are also brought to the front of the table.

Each of the six wires 12 is guided horizontally by a suitable idler pulley, thence upwardly in an open loop over a corresponding movable adjusting scale pulley 14, and then run downward in an open loop to suspend an idler pulley 15. Each pulley 15 is provided with a weight 16, the upward movement of which is limited by a stop 16a fixed to the table 1. The six wires 12, after looping around their respective pulleys 14 and 15, are guided by other pulleys and accumulated in such a manner that they may be attached to a common tension weight 17.

Two vertical scale boards 18 are mounted at the front of the table, on the outer side of the two front posts 3. Each scale board 18 is provided with three vertical slots 19, in each of which rides a clamp device 20 which supports its corresponding scale pulley 14 and a scale pointer 21, the pulley 14 being positioned behind the scale board 18, and the scale pointer 21 overlying the front thereof to cooperate with a time scale 22 which extends along one side of each slot 19. The scales 22 are not parallel with their respective slots 19 but diverge therefrom as they extend downwardly. Each scale pointer 21 is rotatable about a horizontal axis provided by the clamp device 20. A temperature compensating scale 23 on the pointer 21 indicates the adjustment of the pointer 21 in this respect, and the combination of the slanting scale 22 and rotating pointer 21 provides a variable multiplying factor for temperature correction corresponding to the variable temperatures encountered in the sound range.

A plumb line 24, suspended from the impulse origin ring 9, is weighted by a plumb bob 25 and carries a series of markers 26. The plumb line 24 extends downward through the plane of the table 1. The table 1 carries two horizontal coordinate scales 27 and 28, the scale 28 being mounted on a traveler frame 29 capable of moving backward and forward with respect to the table 1. The scale 27 is rigidly attached to one end of the table 1, and the traveler frame 29 carries a pointer 27' which co-operates with the side 27. The traveler frame 29 supports a slide 30 which co-operates with its coordinate scale 28. The slide 30 supports a vertical coordinate scale 31 capable of vertical adjustment and which is arranged to measure the distance between the plane of the table 1 and the closest of the markers 26.

Figure 27:
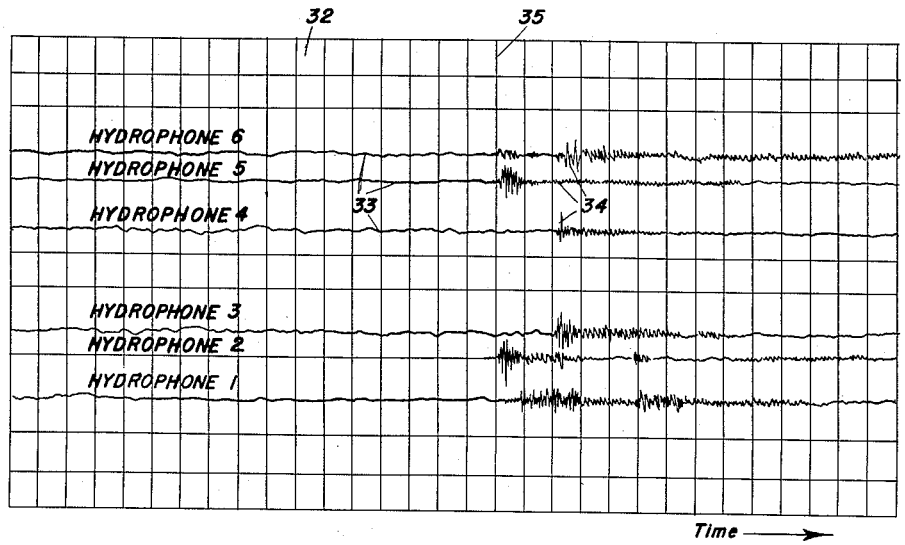
Fig. 27 is a chart from which the data necessary to set the computing machine are obtained.

Operation of the computing machine is as follows: Data suitable for use in the computing machine are obtained from six hydrophones positioned at points on the range corresponding to the positions of the centers of the pulleys 8. Sound from such hydrophones is recorded on a chart 32 such as shown in Fig. 27 by suitable recording means, the output of each hydrophone being shown as an individual trace 33 on the chart 32. The trace 33 fluctuates, as indicated by vibrations 34, when sound impinges upon the corresponding hydrophone. Assuming that the sound is travelling at a uniform velocity in all directions from its origin, the differences in times of arrival of the sound at the different hydrophones will be in proportion to their differences in radial distance from the point of origin of the sound. Thus, as shown in the chart, the vibrations 34 differ by measurable amounts in time of arrival.

The exact time at which the sound occurred need not be known, the relative differences in time of arrival being obtainable from the chart. Any arbitrary point of time preferably at or before the time of arrival of the sound at the closest hydrophone, such as the time represented by a vertical line 35 on the chart 32, is chosen as an arbitrary base, and the differences in time from this base 35 to the arrival times 34 at the different hydrophones are measured on the chart.

The distances between the centers of the pulleys 8 in the computing machine represent to scale the distances between the corresponding hydrophones. Upon solution of a given problem, the distances between the center of the impulse origin ring 9 and the centers of the pulleys 8 represent to scale the distances from the point of sound origin to the hydrophones. While this is actually true of the illustrated apparatus, it will be obvious that the displacement might be made proportional in some manner other than uniform, and that equally useful and interpretable results would be secured. It will in fact be noted that in the planar embodiment herein shown, the arrangement and displacement do not follow a uniform proportion. This embodiment will presently be considered in greater detail.

Initial adjustment is accomplished by setting the brackets 5 on the posts 3 in the scale positions of the hydrophones. Calibration of the apparatus may be accomplished in either of two ways. First, if the wire lines are so adjusted at the tension weight 17 that when the impulse origin ring 9 is equidistant from the centers of the pulleys 8, the scale pointers 21 occupy similar points or numerically identical points on their respective scales 22, the idler pulleys 15 are tight against their stops 16a, and the tension on all wire lines is in equilibrium due to the common weight 17; then, for any position of the ring 9 within the range capacity of the machine, there are corresponding relative positions for the scale pointers 21, and differences in the relative positions of the scale pointers 21 introduced by subsequent adjustments of the pointers 21 will be in proportion to the differences in distance from the ring 9 to the center of the several pulleys 8. The second method consists in using the time data from an acoustic sound record taken with the sound origin at a known point within the acoustic array. The sound origin ring 9 may then be set at this given point by means of the scales provided and the wire lengths so adjusted at the tension weight 17 that all idler weights 16 are against their respective stops and the scale pointers 20 read the measured time as taken from the acoustic record. This calibrates the machine for any other problem within the array.

Inasmuch as the distances between the ring 9 and the pulleys 8 are scale representations of the spatial relation between the point of sound origin and the hydrophones, it is merely necessary to set the scale pointers 21 so that their differences in position correspond to the differences between the reference line 35 and the arrival point 34, as noted on the chart 32, in order to locate the ring 9 in a position in space corresponding to the point at which the sound originated. This is portrayed in Fig. 28, which involves only a two dimensional system. When the pointers 21 are set at positions 1A, 2A, and 3A, the impulse origin ring 9A is located at X whereas when the pointers 21 are set at positions 1B, 2B, and 3B, the impulse origin moves to Y.

Figure 28:
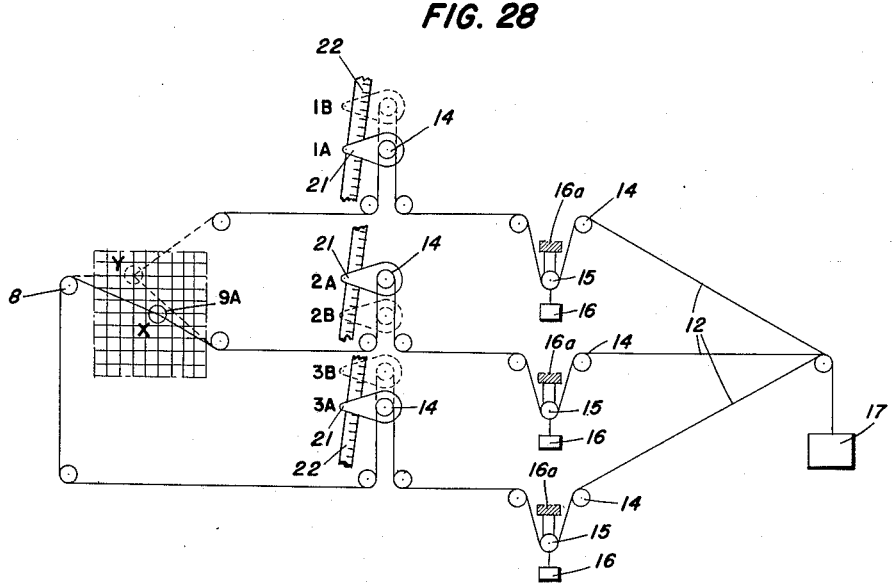
Fig. 28 is a diagrammatic view of a simplified two-dimensional form of the computing machine, illustrating its manner of operation to determine a point in a two dimensional system.

Having established the location of the impulse origin ring 9 in the three dimensional computing machine of Fig. 1–Fig. 26, it is merely necessary to define this position by use of the coordinate scales 27, 28, and 31. In a two dimensional system such as shown in Fig. 28, coordinate paper may be placed under the ring 9 and the point of origin marked directly thereon. Such a system has application, for example, in an off shore range where the hydrophones are positioned at points along a coast to locate sounds emanating from points on or adjacent the surface of the water.

Regardless of the point of sound origin, within the range limits of the machine, when the scale pointers 21 are properly set, all slack in the lines 12 is taken up and the idler pulleys 15 bear against their stops 16a. The idler pulleys 15 and their weight 16 serve principally during the process of setting the computing machine and as a check on the time scale settings for each; if the scales 22 are improperly set or the data are inaccurate, one or more of the idler pulleys 15 would not be in contact with their stops 16a. The idler pulleys 15 bear against stops 16a at not only the initial adjustment of the apparatus, but also bear against the stops for every real solution of a problem. Referring to Fig. 28 showing the three hydrophone array computer for problems in one plane, it will be seen that the conditions for solving for the origin of sound on the basis of the difference in time of arrival from the source to the various hydrophones can only be satisfied if the total length of each wire from the sound origin plotting position to the common weight 17 remains unchanged, however arbitrary this length may be. This condition is assured for the real solution of a problem only if the idler weights bear against their respective stops 16a.

In the embodiment of Fig. 1–Fig. 26, four hydrophones and four sets of wire and pulley systems would be sufficient to locate the point of sound origin; the two extra hydrophones and corresponding pulleys and wire systems, however, serve to check the accuracy of the data.

The temperature of the liquid through which the sound must pass influences the speed of the sound. This is compensated for by turning the scale pointers 21 up or down, indicated by dotted lines in Fig. 5. Also, the greater the distance between the point of origin and any given hydrophone, the greater is the effect of water temperature. Consequently, the time scales 22 are not parallel to the slots 19 but diverge downward as will be observed in Fig. 1. The higher the pointer 21 on the scale 22, the shorter is the distance between the point of sound origin and the hydrophone.

If the point of sound origin is within the boundary of the space figure defined by the hydrophones, the impulse origin ring 9 automatically assumes a position of equilibrium. This position of equilibrium is not necessarily equidistant from each of the pulleys, but may be anywhere within the array, depending upon the conditions of the problem. This position of equilibrium may be seen in the two-dimensional computer shown in Fig. 28, wherein the common weight 17 is large enough to overcome both friction and the combined idler weights 16. The sound origin ring 9A, therefore, is automatically drawn to a position of equilibrium dependent upon the settings of the scale pointers 21. Thus, the computer mechanically gives the solution for the position of origin of a sound impulse based upon the time difference of arrival of that sound at various hydrophones in known locations. Points outside of the figure defined by the hydrophones may be located by the computing machine if the range of movement of the common weight 17 is great enough. The ring 9, however, will not assume a position of equilibrium automatically, but must be held in a position wherein all other wires are taut.

It is not necessary that the hydrophones define a regular or symmetrical triangular prism as illustrated; they may be irregularly positioned. It is merely necessary that the centers of the pulleys 8 be located at points in space bearing a scale relationship to the locations in space of the hydrophones, as indicated above.

I claim:
1. A machine for computing the point in space of a sound impulse from data indicative of the differences in time of reception of the said sound impulse by sound sensitive devices occupying a known spatial relationship with respect to one another, comprising a plurality of guide means having effective centers corresponding on a reduced scale to the spatial relationship of the said sound sensitive devices, a member representing the point of origin of the said sound impulse, lines radiating from the said member through the said guide means, tensioning means common to the said lines beyond said guide means, adjustable means interposed between the said guide means and the said tensioning means adapted to vary the relative lengths of the lines between the said member and the said guide means, a pointer and scale associated with the said adjustable means, means interposed in each of the said lines between the said guide means and the said tensioning means for taking up excess length of line, said lines between said member and said tensioning means being of selected lengths such that said tensioning means, upon proper adjustment of said adjustable means commensurate with differences in the time of reception of said sound impulse by said sound sensitive devices, will dispose said member in a position of similitude relative to the point of origin of said sound impulse, and stops engaged by the said take up means when the said adjustable means is set in correspondence with the spatial relationship of the said point of sound impulse origin and the said sound sensitive devices.

2. A machine for computing the point in space of a sound impulse from data indicative of the differences in time of reception of the said sound impulse by sound sensitive devices occupying a known spatial relationship with respect to one another, comprising a plurality of guide means positioned correspondingly but on a reduced scale to the spatial relationship of the said sound sensitive devices, a member representing the point of origin of the said sound impulse, lines radiating from the said member through the said guide means, take-up means common to the said lines beyond said guide means, adjustable means interposed between the said guide means and the said take-up means adapted to vary the relative lengths of the lines between the said member and the said guide means, indicating means associated with the said adjustable means, supplemental take-up means interposed in each of the said lines between the said guide means and the said take-up means for taking up excess length of line existing individually in each of the said lines, stops engageable by each of the said supplemental take-up means when all of the said adjustable means are set in correspondence with the spatial relationship of the point of origin of the said sound impulse and the said sound sensitive devices, and coordinate scale means for measuring the location of the said sound impulse origin member with respect to an arbitrary base.

3. A computing machine as set forth in claim 2, said adjustable means carrying indexes each adapted to be set in any one of a plurality of positions representing different temperatures of the sound transmitting medium between the origin and the sound sensitive devices, and stationary scales cooperable with said indexes adapted to indicate sound transmission times between the origin and said sound sensitive devices.

References Cited in the file of this patent

UNITED STATES PATENTS

| 1,806,350 | Hire | May 19, 1931 |
| 1,905,315 | Stephenson | Apr. 25, 1933 |
| 2,220,399 | Fagerholm | Nov. 5, 1940 |
| 2,406,953 | Lewis | Sept. 3, 1946 |

FOREIGN PATENTS

| 837,822 | France | Feb. 21, 1939 |
| 319,680 | Germany | Feb. 23, 1920 |
| 16,316 | Great Britain | Nov. 19, 1915 |